United States Patent
Cheng et al.

(10) Patent No.: US 11,835,344 B2
(45) Date of Patent: Dec. 5, 2023

(54) CONTOUR LINE MATCHING METHOD BASED ON SLIDING WINDOW DATA BACKTRACKING

(71) Applicant: SOUTHEAST UNIVERSITY, Nanjing (CN)

(72) Inventors: Xianghong Cheng, Nanjing (CN); Peng Ding, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/253,858

(22) PCT Filed: Oct. 10, 2022

(86) PCT No.: PCT/CN2022/124229
§ 371 (c)(1),
(2) Date: May 22, 2023

(87) PCT Pub. No.: WO2023/087971
PCT Pub. Date: May 25, 2023

(65) Prior Publication Data
US 2023/0332899 A1    Oct. 19, 2023

(30) Foreign Application Priority Data
Nov. 18, 2021   (CN) .......................... 202111368353.3

(51) Int. Cl.
G01C 21/30    (2006.01)
G01C 21/16    (2006.01)
G06F 17/16    (2006.01)

(52) U.S. Cl.
CPC ........... G01C 21/30 (2013.01); G01C 21/165 (2013.01); G06F 17/16 (2013.01)

(58) Field of Classification Search
CPC ........ G01C 21/30; G01C 21/165; G06F 17/16
See application file for complete search history.

(56) References Cited

U.S. PATENT DOCUMENTS

2006/0036367 A1*  2/2006  Brewster ............... G01V 11/00
                                                        702/14
2012/0022820 A1    1/2012  Schmitz et al.
(Continued)

FOREIGN PATENT DOCUMENTS

CN    101520328 A    9/2009
CN    104390646 A    3/2015
(Continued)

OTHER PUBLICATIONS

Z. Tong and S. Bian, "Study on the Algorithm of Sea Bottom Terrain Match," 2009 Second International Conference on Information and Computing Science, Manchester, UK, 2009, pp. 179-182, doi: 10.1109/ICIC.2009.52. (Year: 2009).*

(Continued)

*Primary Examiner* — Abby Y Lin
*Assistant Examiner* — Danielle Marie Jackson
(74) *Attorney, Agent, or Firm* — Muncy, Geissler, Olds & Lowe

(57) ABSTRACT

To obtain a global optimal navigation track, a contour line matching method based on sliding window data backtracking includes the steps of determining sliding window parameters according to the calculation performance of a real-time multi-task operating system and aided navigation precision requirements, constructing a sliding window data backtracking framework by using historical physical field value matching data, obtaining a rotation transformation matrix from an indication track point set to a closest reference point set by adopting a matrix eigenvalue and eigenvector decomposition method, and moving a sliding window and performing forward and reverse cyclic matching to achieve a global track constraint, thereby improving the matching precision and robustness.

10 Claims, 4 Drawing Sheets

(56) References Cited

U.S. PATENT DOCUMENTS

| | | | | |
|---|---|---|---|---|
| 2016/0356608 | A1* | 12/2016 | Dong | G01S 19/50 |
| 2019/0346572 | A1* | 11/2019 | Fowe | G01S 19/06 |
| 2020/0309535 | A1* | 10/2020 | Shi | G01C 21/3407 |
| 2021/0095990 | A1* | 4/2021 | Fowe | G01C 21/3691 |
| 2023/0049471 | A1* | 2/2023 | Chen | G06F 17/16 |
| 2023/0071794 | A1* | 3/2023 | Shim | G06V 20/588 |
| 2023/0194269 | A1* | 6/2023 | Sakr | G01C 21/30 701/400 |

FOREIGN PATENT DOCUMENTS

| | | | |
|---|---|---|---|
| CN | 107330898 | A | 11/2017 |
| CN | 107883948 | A | 4/2018 |
| CN | 111486845 | A | 8/2020 |
| CN | 111964667 | A | 11/2020 |
| CN | 113254562 | * | 8/2021 |
| CN | 113554060 | * | 10/2021 |
| EP | 2 133 662 | A2 | 12/2009 |

OTHER PUBLICATIONS

Li Z, Zheng W, Wu F. Geodesic-Based Method for Improving Matching Efficiency of Underwater Terrain Matching Navigation. Sensors (Basel). Jun. 16, 2019;19(12):2709. doi: 10.3390/s19122709. PMID: 31208139; PMCID: PMC6630211. (Year: 2019).*

Liu, Chengxiang et al., "Study on Technique for Seabottom Terrain Mapping System by Means of Rapid ICCP Algorithm," Ship Engineering, Jun. 24, 2003, pp. 54-56, vol. 25, Issue No. 3, China Academic Journal Electronic Publication House.

Zhu, Yixian et al., "An Intelligent Fault-Tolerant Strategy for AUV Integrated Navigation Systems," 2015 IEEE International Conference on Advanced Intelligent Mechatronics (AIM), Jul. 7-11, 2015, pp. 269-274, Busan, Korea.

* cited by examiner

CONTOUR LINE MATCHING METHOD BASED ON SLIDING WINDOW DATA BACKTRACKING

TECHNICAL FIELD

The present disclosure relates to a contour line matching method based on sliding window data backtracking, and belongs to the field of geophysical field aided inertial navigation.

BACKGROUND

An inertial navigation system is an autonomous navigation system, which does not depend on any other external information and does not radiate energy outwards. It has the advantages of high concealment, high short-term positioning precision and high data updating rate, and it has the disadvantages that navigation and positioning errors accumulate over time, which makes it impossible for an underwater vehicle to achieve long-term deep-sea navigation. In order to control the positioning error range, the vehicle usually needs to float regularly to receive satellite navigation signals and correct navigation errors, which causes the decrease of the concealment of the vehicle and the increase of energy consumption. In recent decades, due to the development of the geophysical feature technology (including a measurement sensor, the cartographic accuracy, etc.), it is possible to use geophysical features to assist navigation. The combination of a geophysical field (terrain/geomagnetism/gravity) aided navigation system and the inertial navigation system can make up for the deficiency of the inertial navigation system error accumulated over time. It has the advantages of high precision, good concealment and energy saving, so more attention are paid by the majority of scholars. The geophysical field aided navigation system is mainly composed of a geophysical field reference map, a geophysical field sensor and a navigation matching algorithm. After the vehicle enters a geophysical field adaptation area, the measured geophysical quantity matches the reference map stored in a computer to obtain the absolute positioning information of the vehicle, finally, the information is fused with navigation parameters output by the inertial navigation system, and the positioning error of the inertial navigation system is corrected.

At present, geophysical field aided navigation methods mainly include a terrain contour matching (TERCOM) algorithm, an iterated closest contour point (ICCP) algorithm and a Sandia inertia terrain-aided navigation (SITAN) algorithm. The TERCOM algorithm is to accumulate a series of geophysical quantity data measured by the vehicle to be processed. According to the correlation between the physical quantity measurement sequence and the reference database sequence, the position of the vehicle is determined. The more the accumulated physical quantity measured values, the more accurate the matching position. However, the method is sensitive to the course error and is not suitable for large maneuvering navigation. The SITAN algorithm uses a Kalman filter technique to recurse the measurement data collected in real time so as to obtain the optimal estimation of the inertial navigation system error. However, the assumption that the vehicle position error is linearly related to the variation of the geophysical field eigenvalue is established only when the real position is not far from the inertial navigation indication position. When the inertial navigation position error is large, mismatching may be caused, and eventually, matching failure is caused. The ICCP algorithm is an Iterative algorithm that uses rigid transformation to continuously approach the closest point on the contour line and carries out registration. It is developed on the basis of the iterative close point (ICP) algorithm. At first, the ICCP algorithm is widely used in the field of image registration. In 1999, Behzed extracted the iterative closest point algorithm from ICP, applied it to the navigation algorithm of the underwater vehicle, and proposed the iterated closest contour point algorithm. The ICCP algorithm is based on that the real position of the vehicle is the closest point from the contour line corresponding to the physical measured value to the inertial navigation indication position. Therefore, the application of this algorithm is constrained by the assumption that the error between the inertial navigation indication position and the real position of the vehicle needs to be small enough, but this constraint can be satisfied after a rough search by the TERCOM algorithm. In practical applications, the ICCP algorithm is operated on the premise that the measured value of the physical field sensor should be accurate enough, so that it is meaningful to search the closest point on the contour line. However, the ICCP algorithm uses the measured physical field value under a local track for matching each time. Due to the limited number of data points matched each time, the matched track result is the local optimal solution, and the optimal solution of a real track is not obtained. Therefore, in order to obtain a global optimal navigation track, a sliding window data backtracking framework is constructed by using historical matching data to improve the robustness and precision of contour line matching.

SUMMARY

The purpose of the present disclosure: in order to overcome the defects of the prior art and effectively solve the problem that the ICCP algorithm is easy to fall into the local optimal solution due to the limitation of the number of matching points, the present disclosure aims to provide a contour line matching method based on sliding window data backtracking. Matching iteration is performed on indication track points in all sliding windows at the historical moment and the closest point on the corresponding contour line to find the global optimal track, and a matrix eigenvalue and eigenvector decomposition method is used to obtain a rotation transformation matrix from an indication track point set to a closest reference point set.

The described objective is achieved by the following technical solutions: A contour line matching method based on sliding window data backtracking, where the method includes the following steps:

(1) after a vehicle enters a geophysical field adaptation area, measuring and storing a measured physical field value corresponding to a track point through a physical field sensor carried by the vehicle, meanwhile, storing latitude and longitude coordinates of an indication track point output by an inertial navigation system, and extracting a physical field reference database for an area according to information of the latitude and longitude coordinates provided by the inertial navigation system;

(2) extracting latitude and longitude coordinates ($\lambda_0$, $L_0$) of a starting point in the physical field reference database obtained in the step (1), and converting the latitude and longitude coordinates ($\lambda$, L) of the indication track point output by the inertial navigation system into coordinates (pE, pN) of a relative position using the latitude and longitude coordinates ($\lambda_0$, $L_0$) of the starting point as an origin, i.e.:

$$\begin{cases} p_E = (\lambda - \lambda_0) \times 60 \times 1853 \times \cos(L_0 \times \pi/180) \\ p_N = (L - L_0) \times 60 \times 1853 \end{cases} \quad (1)$$

in the formula, $\lambda_0$ and $L_0$ respectively represent the latitude and longitude coordinates of the starting point in the physical field reference database, and the unit is degree; $\lambda$ and L respectively represent the latitude and longitude coordinates of the indication track point output by the inertial navigation system, and the unit is degree; and pE and pN respectively represent a relative east coordinate and a relative north coordinate of the indication track point output by the inertial navigation system, and the unit is meter;

(3) determining a sliding window length N, a sliding window moving step length L and forward and reverse cyclic matching times IC of a sliding window according to the calculation performance of a real-time multi-task operating system and aided navigation precision requirements, where N represents the sliding window length, L represents the sliding window moving step length, IC represents the forward and reverse cyclic matching times of the sliding window, N, L and IC are all positive integers and satisfy N≤L;

(4) according to the measured physical field value $h_i$ corresponding to the track point obtained in the step (1) and the coordinates of the relative position of the indication track point obtained in the step (2), extracting a contour line $c_i$ close to the inertial navigation system indication track point $p_i$ in a sliding window determined in the step (3), and searching a corresponding closest reference point $y_i$ from the indication track point in the sliding window to the close contour line, where i represents the $i^{th}$ indication track point in the sliding window (1=1, 2, . . . , N), $h_i$ represents the measured physical field value corresponding to the $i^{th}$ track point, $p_i$ represents the coordinates of the relative position of the $i^{th}$ indication track point, $c_i$ represents the contour line close to the $i^{th}$ indication track point corresponding to the measured physical field value $h_i$ extracted in the physical field reference database, and $y_i$ represents the coordinates of a two-dimensional position from the $i^{th}$ indication track point to the closest reference point on the contour line $c_i$;

(5) according to the closest reference point searched in the step (4) and the indication track point in the sliding window, constructing an incidence matrix M, calculating an eigenvalue and a unit eigenvector of a two-order symmetric positive definite matrix $S=M^TM$, and thus determining a rotation matrix R and a translation vector t;

firstly, making a new transformation to the indication track point $p_i$ (i=1, 2, . . . , N) in the sliding window and the closest reference point $y_i$ (i=1, 2, . . . , N), i.e.:

$$P'_i = P_i - \overline{P}, y'_i = y_i - \overline{y} \quad (2)$$

in the formula, $\overline{P}$ represents centroid coordinates of the indication track point set in the sliding window, $$\overline{p} = \frac{1}{N}\sum_{i=1}^{N} p_i; \overline{y}$$

represents centroid coordinates of the closest reference point set in the sliding window, $$\overline{y} = \frac{1}{N}\sum_{i=1}^{N} y_i;$$

and $P'_i$, (i=1, 2, . . . , N) and $y'_i$ (i=1, 2, . . . , N) respectively represent position coordinates of the indication track point in the sliding window and the closest reference point relative to centroids of their own point sets;

then constructing the incidence matrix M by using the position coordinates $P'_i$ and $y'_i$ relative to the centroids of the point sets as follows:

$$M = \sum_{i=1}^{N} y'_i p'^T_i \quad (3)$$

in the formula, M represents a two-order square matrix formed by the indication track point $p'_i$ (i=1, 2, . . . , N) and the closest reference point $y'_i$ (i=1, 2, . . . , N) transformed relative to the centroid coordinates of the point sets; and T in the upper right corner of the matrix represents the transpose of the matrix;

then constructing the two-order symmetric positive definite matrix $S=M^TM$ by using M, and solving a positive eigenvalue and a unit eigenvector corresponding to the positive eigenvalue of the two-order symmetric positive definite matrix S, so that the following formula is satisfied:

$$S = \lambda_1 u_1 u_1^T + \lambda_2 u_2 u_2^T \quad (4)$$

in the formula, $\lambda_1$ and $\lambda_2$ represent the eigenvalue of the two-order symmetric positive definite matrix S, $u_1$ represents the unit eigenvector corresponding to the eigenvalue $\lambda_1$ of S, and $u_2$ represents the unit eigenvector corresponding to the eigenvalue $\lambda_2$ of S;

finally, obtaining the rotation matrix R from the indication track point set to the closest reference point set according to the incidence matrix M and the eigenvalue and eigenvector of the two-order symmetric positive definite matrix S as follows:

$$R = M\left(\frac{1}{\sqrt{\lambda_1}} u_1 u_1^T + \frac{1}{\sqrt{\lambda_2}} u_2 u_2^T\right) \quad (5)$$

obtaining the translation vector t according to the centroid coordinates $\overline{P}$ of the indication track point set in the sliding window, the centroid coordinates $\overline{y}$ of the closest reference point set and the rotation matrix R as follows:

$$t = \overline{y} - R\overline{p} \quad (6)$$

(6) updating the position of the indication track point in the sliding window by using the rotation matrix R and the translation vector t obtained in the step (5), judging whether the number of iterations in the sliding window exceeds the limit or satisfies convergence conditions, executing the step (4) if the number of iterations does not exceed the limit or satisfy the convergence conditions, and otherwise, executing the next step, where the sum of the squared euclidean distance between the closest reference point set Y and the indication track point set P in the sliding window is:

$$d_k(Y, RP+t) = \sum_{i=1}^{N} \|y_i - (Rp_i + t)\|^2 \qquad (7)$$

in the formula, $Y=\{y_i, i=1, 2, \ldots, N\}$ represents the closest reference point set in the sliding window, $P=\{p_i, i=1, 2, \ldots, N\}$ represents the indication track point set in the sliding window, $d_k$ represents the sum of the squared euclidean distance between the set Y and the set P after transformation for k ($k=1, 2, \ldots$) times, and $\|X\|$ represents a 2-norm of the vector X;

the convergence conditions need to be satisfied at the same time:

(1) a constant g is given on the basis of the matching precision requirement, so that $$\frac{|d_k - d_{k-1}|}{d_k} \leq \varepsilon;$$

and (2) a constant δ is given on the basis of the matching precision requirement, so that $d_k \leq \delta$; where $d_{k-1}$ represents the sum of the squared euclidean distance between the set Y and the set P after transformation for k−1 ($k=2, 3, \ldots$) times;

(7) judging whether the forward and reverse cyclic matching times of the sliding window are reached, if not, moving the sliding window according to the sliding window moving step length in the step (3) and executing the step (4), and if yes, completing global optimal track point matching.

Beneficial Effects:

Compared with the prior art, the present disclosure has the advantages that the defects of an existing ICCP algorithm in principle are overcome, a contour line matching method based on sliding window data backtracking with a proper window length is constructed on the basis of the existing ICCP algorithm, matching iteration is performed on the indication track points in all the sliding windows at the historical moment and the closest point on the corresponding contour line to find the global optimal track, the method for calculating the rotation transformation matrix by using the matrix eigenvalue and eigenvector decomposition method is simple and easy, the problem that the ICCP algorithm is easy to fall into the local optimal solution due to the limitation of the number of matching points is effectively solved, and the precision and robustness of matching positioning are improved.

DETAILED DESCRIPTION

The technical solution of the present disclosure will be described in detail below with reference to drawings.

Embodiment 1

Figure 1:
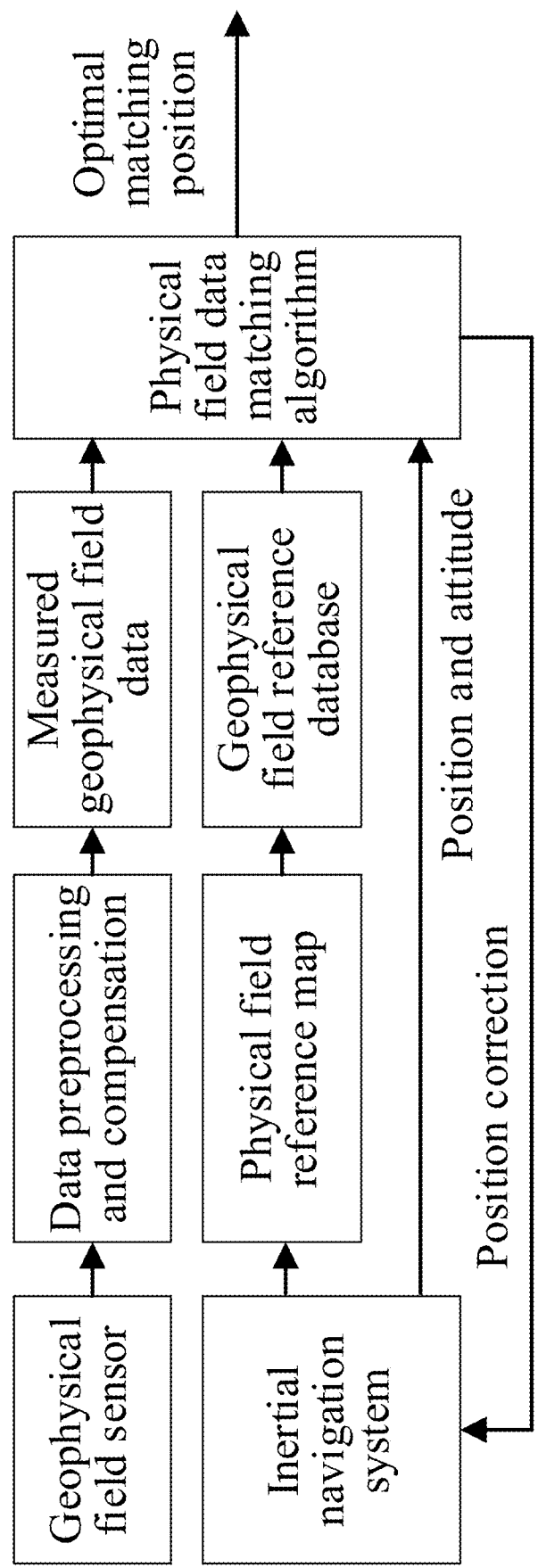
FIG. 1 is a basic functional block diagram of a geophysical field aided inertial navigation system.

As shown in FIG. 1, a geophysical field aided inertial navigation system is mainly composed of a geophysical field sensor, an inertial navigation system, a geophysical field reference map and a matching algorithm. The geophysical field sensor has the effect of measuring geophysical field data corresponding to a vehicle track point in real time, and after data preprocessing and error compensation, the geophysical field data can be used as an actual physical field measured value to be matched. As a main navigation system, the inertial navigation system can provide navigation parameter information of a vehicle in real time and has high updating rate of data output. The geophysical field reference map is a digital map for an area extracted from a computer according to an inertial navigation indication position, and is presented in the form of a geophysical field reference database or a digital elevation model stored in a two-dimensional array. The matching algorithm has the effect of matching the measured physical field sequence value with the reference database so as to eventually obtain the optimal position information of the vehicle and is applied to error correction of the inertial navigation system.

Figure 2:
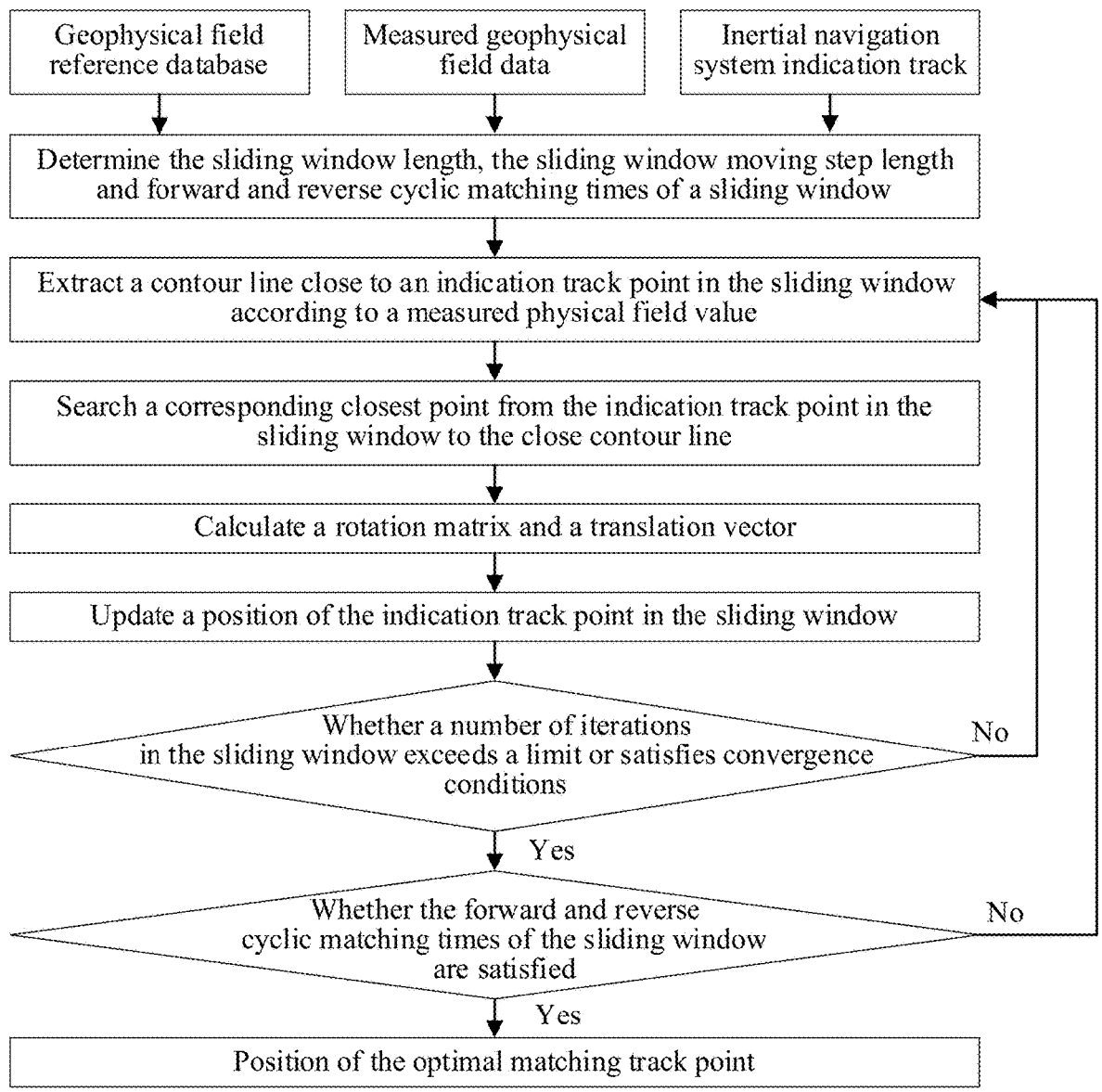
FIG. 2 is a schematic flowchart of the present disclosure.
Figure 3:
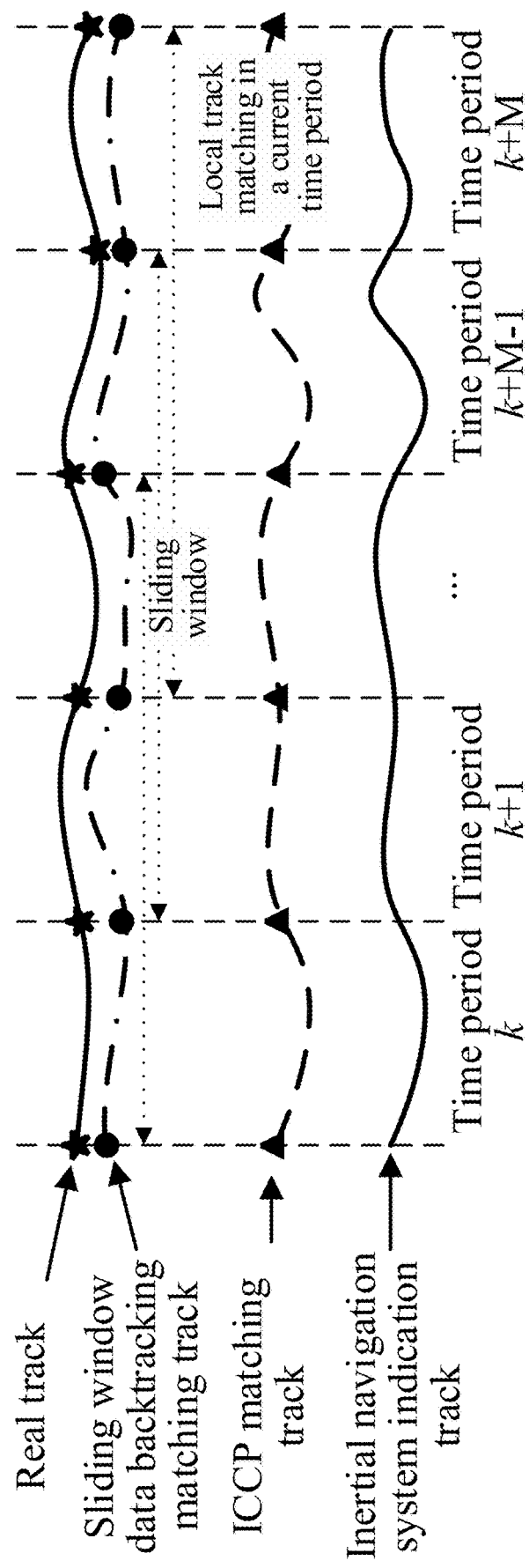
FIG. 3 is a schematic diagram for performing sliding window data backtracking on data at the historical moment.

With regard to the matching algorithm, in order to overcome the defects of the prior art and effectively solve the problem that the ICCP algorithm is easy to fall into the local optimal solution due to the limitation of the number of matching points, the present disclosure provides a contour line matching method based on sliding window data backtracking. Matching iteration is performed on the closest points on contour lines in all sliding windows at the historical moment to find the global optimal track, and a matrix eigenvalue and eigenvector decomposition method is used to obtain a rotation transformation matrix. As shown in FIG. 2, the contour line matching method includes the following specific steps:

(1) terrain aided navigation in an underwater vehicle is taken as an example, after the vehicle enters a terrain adaptation area, a water depth value corresponding to a track point is measured and stored through a depthometer and a pressure gage carried by the vehicle, and a water depth reference database for an area is extracted according to a position provided by the inertial navigation system;

(2) latitude and longitude coordinates of a starting point in the water depth reference database obtained in the step (1) are extracted, and latitude and longitude coordinates of an indication track point output by the inertial navigation system are converted into coordinates of a relative position using the latitude and longitude coordinates of the starting point as an origin;

(3) a sliding window length is determined as 15 water depth value sampling points, a sliding window moving step length is determined as 5 water depth value sampling points and forward and reverse cyclic matching times of a sliding window are determined as 4 times according to the calculation performance of a real-time multi-task operating system and aided navigation precision requirements;

(4) according to a measured water depth value $h_i$ in the sliding window, a water depth contour line $c_i$ close to the inertial navigation system indication track point $p_i$ in the sliding window in the water depth reference database is extracted, and the closest reference point $y_i$ of $p_i$ on the water depth contour line $c_i$ is searched, where i represents the $i^{th}$ indication track point in the sliding window (i=1, 2, ..., 15), $h_i$ represents the measured physical field value corresponding to the $i^{th}$ track point, $p_i$ represents the coordinates of the relative position of the $i^{th}$ indication track point, $c_i$ represents the contour line close to the $i^{th}$ indication track point corresponding to the measured physical field value $h_i$ extracted in the physical field reference database, and $y_i$ represents the coordinates of a two-dimensional position from the $i^{th}$ indication track point to the closest reference point on the contour line $c_i$;

(5) according to the closest reference point searched in the step (4) and the indication track point in the sliding window, an incidence matrix M is constructed, an eigenvalue and a unit eigenvector of a two-order symmetric positive definite matrix $S=M^TM$ are calculated, and thus a rotation matrix R and a translation vector t from an indication track point set to a closest reference point set are determined;

firstly, a new transformation is made to the indication track point $p_i$ (i=1, 2, ..., 15) in the sliding window and the closest reference point $y_i$(i=1, 2, ..., 15), i.e.:

$$P'_i = P_i - \overline{P}, y'_i = y_i - \overline{y} \quad (2)$$

in the formula, $\overline{P}$ represents centroid coordinates of the indication track point set in the sliding window, $$\overline{p} = \frac{1}{15}\sum_{i=1}^{15} p_i;$$

$\overline{y}$ represents centroid coordinates of the closest reference point set in the sliding window, $$\overline{y} = \frac{1}{15}\sum_{i=1}^{15} y_i;$$

and $p'_i$ (i=1, 2, ..., 15) and $y'_i$ (i=1, 2, ..., 15) respectively represent position coordinates of the indication track point in the sliding window and the closest reference point relative to centroids of their own point sets;

then the incidence matrix M is constructed by using the position coordinates $P'_i$ and $y'_i$ relative to the centroids of the point sets as follows:

$$M = \sum_{i=1}^{15} y'_i p_i'^T \quad (8)$$

in the formula, M represents a two-order square matrix formed by the indication track point $p'_i$ (i=1, 2, ..., 15) and the closest reference point $y'_i$ (i=1, 2, ..., 15) transformed relative to the centroid coordinates of the point sets; and T in the upper right corner of the matrix represents the transpose of the matrix;

then the two-order symmetric positive definite matrix $S=M^TM$ is constructed by using M, and a positive eigenvalue and a unit eigenvector corresponding to the positive eigenvalue of the two-order symmetric positive definite matrix S are solved, so that the following formula is satisfied:

$$S = \lambda_1 u_1 u_1^T + \lambda_2 u_2 u_2^T \quad (4)$$

in the formula, $\lambda_1$ and $\lambda_2$ represent the eigenvalue of the two-order symmetric positive definite matrix S, $u_1$ represents the unit eigenvector corresponding to the eigenvalue $\lambda_1$ of S, and $u_2$ represents the unit eigenvector corresponding to the eigenvalue $\lambda_2$ of S;

finally, the rotation matrix R is obtained according to the incidence matrix M and the eigenvalue and eigenvector of the two-order symmetric positive definite matrix S as follows:

$$R = M\left(\frac{1}{\sqrt{\lambda_1}} u_1 u_1^T + \frac{1}{\sqrt{\lambda_2}} u_2 u_2^T\right) \quad (5)$$

the translation vector t is obtained according to the centroid coordinates $\overline{p}$ of the indication track point set in the sliding window, the centroid coordinates $\overline{y}$ of the closest reference point set and the rotation matrix R as follows:

$$t = \overline{y} - R\overline{p} \quad (6)$$

(6) the position of the indication track point in the sliding window is updated by using the rotation matrix R and the translation vector t obtained in the step (5), whether 8 iterations in the sliding window exceeds the limit or satisfies convergence conditions is judged, the step (4) is executed if the 8 iterations do not exceed the limit or satisfy the convergence conditions, and otherwise, the next step is executed, where the sum of the squared euclidean distance between the closest reference point set Y and the indication track point set P in the sliding window is:

$$d_k(Y, RP + t) = \sum_{i=1}^{15} \|y_i - (Rp_i + t)\|^2 \quad (9)$$

in the formula, Y={$y_i$, i=1, 2, ..., 15} represents the closest reference point set in the sliding window, P={$p_i$, i=1, 2, ..., 15} represents the indication track point set in the sliding window, $d_k$ represents the sum of the squared euclidean distance between the set Y and the set P after transformation for k (k=1, 2, ...) times, and $\|X\|$ represents a 2-norm of the vector X;

the convergence conditions need to be satisfied at the same time:

(1) a constant $\varepsilon$ is given on the basis of the matching precision requirement, so that $$\frac{|d_k - d_{k-1}|}{d_k} \leq \varepsilon;$$

and (2) a constant $\delta$ is given on the basis of the matching precision requirement, so that $d_k \leq \delta$ where $d_{k-1}$ represents the sum of the squared euclidean distance between the set Y and the set P after transformation for k−1 (k=2, 3, ...) times;

(7) whether the forward and reverse cyclic matching times of the sliding window are reached is judged, if not, moving the sliding window according to the sliding window moving step length in the step (3) and the step (4) is executed, and if yes, global optimal track point matching is completed.

Simulation Experiment:

Terrain aided navigation in an underwater vehicle was taken as an example. A navigation track of a vehicle was simulated in a water depth map reference database with a resolution of 10 meters. The initial east and north position errors of an inertial navigation system were set to 180 m and 100 m respectively, the initial course error was set to 3°, the zero drift of a gyro was set to 0.01°/h, the zero offset of an accelerometer was set to 0.001 mg, the sampling frequency of the gyro and the accelerometer was set to 200 Hz, the sampling frequency of a pressure gage and a depthometer was set to 1 Hz, the cruising speed of the vehicle was set to 10 m/s, the initial course angle was north by east by 30°, and the simulation time was set to 20 s. There were 20 corresponding water depth sampling points, and the simulation results were shown in FIG. 4.

Figure 4:
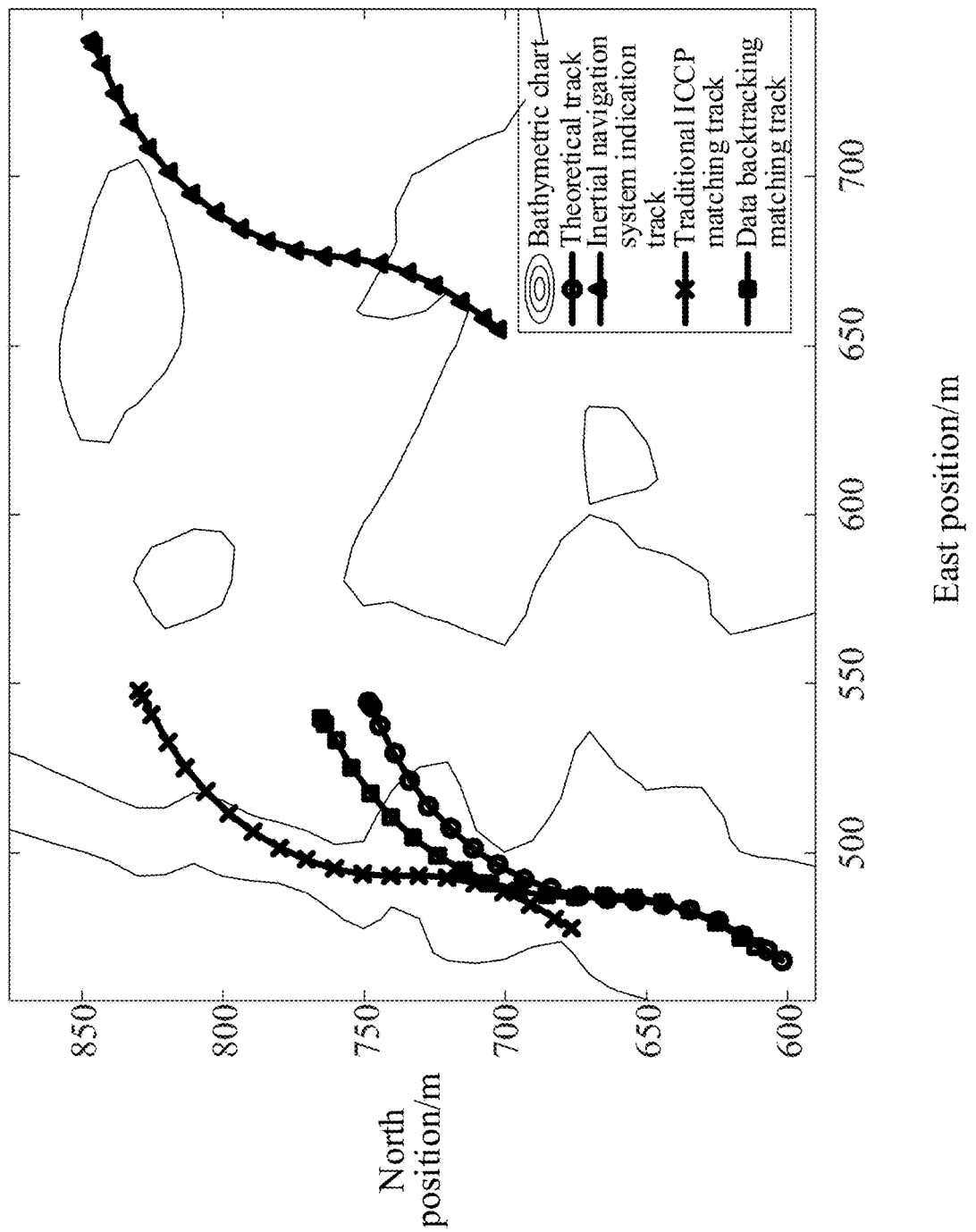
FIG. 4 is a diagram of underwater terrain matching simulation results of the method in the embodiment of the present disclosure.

It can be seen from FIG. 4 that the inertial navigation system indication track is quite different from the real theoretical track of the vehicle. Compared with the inertial navigation system indication track, the track matched by the traditional ICCP algorithm is closer to the theoretical track. The contour line matching method based on sliding window data backtracking provided by the present disclosure has the track matching effect obviously superior to that of the traditional ICCP algorithm, and the data backtracking matching track has an error smaller than that of the traditional ICCP algorithm, and is closer to the theoretical track.

In order to further verify the practical value of the present disclosure, the root-mean-square errors of three tracks including the inertial navigation system indication track, the traditional ICCP matching track and the data backtracking matching track provided by the present disclosure are compared with the theoretical track below.

TABLE 1

Comparison of Root-Mean-Square Errors of Three Tracks

| Mode | Inertial navigation system indication track | Traditional ICCP matching track | Data backtracking matching track |
| --- | --- | --- | --- |
| Root-mean-square error (m) | 215.87 | 77.93 | 12.79 |

It can be seen from Table 1 that the root-mean-square positioning error under the matching track of the contour line matching method based on sliding window data backtracking provided by the present disclosure is the minimum and is 12.79 m, and the precision is close to the resolution of 10 m of the water depth map reference database used in the simulation. If the matching results are used to correct the errors of the inertial navigation system, the navigation and positioning requirements of the underwater vehicle can be satisfied.

As mentioned above, although the present disclosure has been expressed and stated with reference to a particular preferred embodiment, it shall not be construed as a limitation of the present disclosure. Any variation in form and detail may be made without deviating from the spirit and scope defined in claims of the present disclosure.

What is claimed is:

1. A contour line matching method based on sliding window data backtracking,
    wherein the method comprises the following steps:
    (1) after a vehicle enters a geophysical field adaptation area, measuring and storing a measured physical field value corresponding to a track point through a physical field sensor carried by the vehicle, meanwhile, storing latitude and longitude coordinates of an indication track point output by an inertial navigation system, and extracting a physical field reference database for an area according to information of the latitude and longitude coordinates provided by the inertial navigation system;
    (2) extracting latitude and longitude coordinates of a starting point in the physical field reference database obtained in the step (1), and converting the latitude and longitude coordinates of the indication track point output by the inertial navigation system into coordinates of a relative position using the latitude and longitude coordinates of the starting point as an origin;
    (3) determining sliding window parameters according to the calculation performance of a real-time multi-task operating system and aided navigation precision requirements;
    (4) according to the measured physical field value corresponding to the track point obtained in the step (1) and the coordinates of the relative position of the indication track point obtained in the step (2), extracting a contour line close to the inertial navigation system indication track point in a sliding window determined in the step (3), and searching a corresponding closest reference point from the indication track point in the sliding window to the close contour line;
    (5) according to the closest reference point searched in the step (4) and the indication track point in the sliding window, constructing an incidence matrix M, calculating an eigenvalue and a unit eigenvector of a two-order symmetric positive definite matrix $S=M^T M$, and thus determining a rotation matrix R and a translation vector t from an indication track point set to a closest reference point set;
    (6) updating the position of the indication track point in the sliding window by using the rotation matrix R and the translation vector t obtained in the step (5), judging whether the number of iterations in the sliding window exceeds the limit or satisfies convergence conditions, executing the step (4) if the number of iterations does not exceed the limit or satisfy the convergence conditions, and otherwise, executing the next step; and
    (7) judging whether the forward and reverse cyclic matching times of the sliding window are reached, if not, moving the sliding window according to a sliding window moving step length in the step (3) and executing the step (4), and if yes, completing global optimal track point matching.

2. The contour line matching method based on sliding window data backtracking according to claim 1, wherein the step (2) specifically comprises:
    extracting the latitude and longitude coordinates ($\lambda_0$, $L_0$) of the starting point in the physical field reference database obtained in the step (1), and converting the latitude and longitude coordinates ($\lambda$, L) of the indication track point output by the inertial navigation system into the coordinates ($p_E$, $p_N$) of the relative position using the latitude and longitude coordinates ($\lambda_0$, $L_0$) of the starting point as an origin, i.e.:

$$\begin{cases} p_E = (\lambda - \lambda_0) \times 60 \times 1853 \times \cos(L_0 \times \pi / 180) \\ p_N = (L - L_0) \times 60 \times 1853 \end{cases} \quad (1)$$

in the formula, $\lambda_0$ and $L_0$ respectively represent the latitude and longitude coordinates of the starting point in the physical field reference database, and the unit is degrees; $\lambda$ and L respectively represent the latitude and longitude coordinates of the indication track point output by the inertial navigation system, and the unit is degree; and pE and pN respectively represent a relative east coordinate and a relative north coordinate of the indication track point output by the inertial navigation system, and the unit is meter.

3. The contour line matching method based on sliding window data backtracking according to claim 1, wherein the sliding window parameters in the step (3) comprise a sliding window length N, a sliding window moving step length L and the forward and reverse cyclic matching times IC of the sliding window, wherein N represents the sliding window length, L represents the sliding window moving step length, IC represents the forward and reverse cyclic matching times of the sliding window, N, L and IC are all positive integers and satisfy N≥L.

4. The contour line matching method based on sliding window data backtracking according to claim 1, wherein the step (4) specifically comprises:
according to the measured physical field value $h_i$ in the sliding window, extracting the contour line $c_i$ close to the inertial navigation system indication track point $p_i$ in the sliding window in the physical field reference database, and searching the closest reference point $y_i$ of $p_i$ on the contour line $c_i$, wherein
i represents the $i^{th}$ indication track point in the sliding window (l=1, 2, ..., N), $h_i$ represents the measured physical field value corresponding to the $i^{th}$ track point, $p_i$ represents the coordinates of the relative position of the $i^{th}$ indication track point, $c_i$ represents the contour line close to the $i^{th}$ indication track point corresponding to the measured physical field value $h_i$ extracted in the physical field reference database, and $y_i$ represents the coordinates of a two-dimensional position from the $i^{th}$ indication track point to the closest reference point on the contour line $c_i$.

5. The contour line matching method based on sliding window data backtracking according to claim 4, wherein constructing the incidence matrix M in the step (5) specifically comprises:
firstly, making a new transformation to the indication track point $p_i$ (i=1, 2, ..., N) in the sliding window and the closest reference point $y_i$(i=1, 2, ..., N), i.e.:

$$p'_i = p_i - \bar{p}, Y'_i = Y_i - \bar{y} \quad (2)$$

in the formula, $\bar{p}$ represents centroid coordinates of the indication track point set in the sliding window, $$\bar{p} = \frac{1}{N}\sum_{i=1}^{N} p_i;$$

$\bar{y}$ represents centroid coordinates of the closest reference point set in the sliding window, $$\bar{y} = \frac{1}{N}\sum_{i=1}^{N} y_i;$$

and $p'_i$(i=1, 2, ..., N) and $y'_i$ (i=1, 2, ..., N) respectively represent position coordinates of the indication track point in the sliding window and the closest reference point relative to centroids of their own point sets;

then constructing the incidence matrix M by using the position coordinates $P'_i$ and $Y'_i$ relative to the centroids of the point sets as follows:

$$M = \sum_{i=1}^{N} y'_i p'^T_i \quad (3)$$

in the formula, M represents a two-order square matrix formed by the indication track point $p'_i$ (i=1, 2, ..., N) and the closest reference point $y'_i$ (i=1, 2, ..., N) transformed relative to the centroid coordinates of the point sets; and T in the upper right corner of the matrix represents the transpose of the matrix.

6. The contour line matching method based on sliding window data backtracking according to claim 5, wherein calculating the eigenvalue and the unit eigenvector of the two-order symmetric positive definite matrix $S=M^TM$ in the step (5) specifically comprises:
firstly, constructing the two-order symmetric positive definite matrix S by using M, wherein $S=M^TM$; and
then solving the positive eigenvalue and the unit eigenvector corresponding to the positive eigenvalue of the two-order symmetric positive definite matrix S, so that the following formula is satisfied:

$$S = \lambda_1 u_1 u_1^T + \lambda_2 u_2 u_2^T \quad (4)$$

in the formula, $\lambda_1$ and $\lambda_2$ represent the eigenvalue of the two-order symmetric positive definite matrix S, $u_1$ represents the unit eigenvector corresponding to the eigenvalue $\lambda_1$ of S, and $u_2$ represents the unit eigenvector corresponding to the eigenvalue $\lambda_2$ of S.

7. The contour line matching method based on sliding window data backtracking according to claim 6, wherein determining the rotation matrix R from the indication track point set to the closest reference point set in the step (5) specifically comprises:
obtaining the rotation matrix R according to the incidence matrix M and the eigenvalue and eigenvector of the two-order symmetric positive definite matrix S as follows:

$$R = M\left(\frac{1}{\sqrt{\lambda_1}} u_1 u_1^T + \frac{1}{\sqrt{\lambda_2}} u_2 u_2^T\right) \quad (5)$$

8. The contour line matching method based on sliding window data backtracking according to claim 7, wherein determining the translation vector t in the step (5) specifically comprises:
obtaining the translation vector t according to the centroid coordinates $\bar{P}$ of the indication track point set in the sliding window, the centroid coordinates $\bar{y}$ of the closest reference point set and the rotation matrix R as follows:

$$t = \bar{y} - R\bar{P} \quad (6)$$

9. The contour line matching method based on sliding window data backtracking according to claim 1, wherein judging whether the convergence conditions are satisfied in the step (6) specifically comprises:
firstly, updating the position of the indication track point in the sliding window by using the rotation matrix R and the translation vector t obtained in the step (5), and calculating the sum of the squared euclidean distance between the closest reference point set Y and the indication track point set P in the sliding window, wherein the formula is as follows:

$$d_k(Y, RP+t) = \sum_{i=1}^{N} \|y_i - (Rp_i + t)\|^2 \quad (7)$$

in the formula, $Y=\{y_i, i=1, 2, \ldots, N\}$ represents the closest reference point set in the sliding window, $P=\{p_i, i=1, 2, \ldots, N\}$ represents the indication track point set in the sliding window, $d_k$ represents the sum of the squared euclidean distance between the set Y and the set P after transformation fork (k=1, 2, . . . ) times, and $\|X\|$ represents a 2-norm of the vector X;

the convergence conditions need to be satisfied at the same time:

(1) a constant ε is given on the basis of the matching precision requirement, so that $$\frac{|d_k - d_{k-1}|}{d_k} \leq \varepsilon;$$

and (2) a constant δ is given on the basis of the matching precision requirement, so that $d_k \leq \delta$ wherein $d_{k-1}$ represents the sum of the squared euclidean distance between the set Y and the set P after transformation for k−1 (k=2, 3, . . . ) times.

10. The contour line matching method based on sliding window data backtracking according to claim 1, wherein the number of iterations in the sliding window in the step (6) is 8.

* * * * *